United States Patent
Yuan (10) Patent No.: US 9,796,229 B2
(45) Date of Patent: Oct. 24, 2017

(54) SINGLE ARMED TRAILER COUPLER LOCKING DEVICE

(71) Applicant: Guoji Yuan, Foshan (CN)

(72) Inventor: Guoji Yuan, Foshan (CN)

( * ) Notice: Subject to any disclaimer, the term of this patent is extended or adjusted under 35 U.S.C. 154(b) by 0 days.

(21) Appl. No.: 14/530,744

(22) Filed: Nov. 1, 2014

(65) Prior Publication Data

US 2015/0121975 A1     May 7, 2015

Related U.S. Application Data

(60) Provisional application No. 61/899,131, filed on Nov. 1, 2013.

(51) Int. Cl.
    *B60D 1/60*        (2006.01)
    *B60D 1/06*        (2006.01)
    *E05B 67/36*      (2006.01)

(52) U.S. Cl.
    CPC ............... *B60D 1/60* (2013.01); *B60D 1/06* (2013.01); *E05B 67/36* (2013.01); *Y10T 70/5854* (2015.04)

(58) Field of Classification Search
    CPC . B60D 1/065; B60D 1/06; B60D 1/52; B60D 1/60; B60D 1/28; E05B 67/36
    USPC .......... 70/14, 18, 38 A, 38 B, 38 C, 39, 258, 70/232–235, 237; 248/551–553; 280/507, 511, 513
    See application file for complete search history.

(56) References Cited

U.S. PATENT DOCUMENTS

| | | | | |
|---|---|---|---|---|
| 4,730,841 A | * | 3/1988 | Ponder | B60D 1/60 280/501 |
| 4,836,570 A | * | 6/1989 | Lopez | B60D 1/60 280/507 |
| 4,856,308 A | * | 8/1989 | Johnson | 70/209 |
| 5,040,388 A | * | 8/1991 | Chen | 70/209 |
| 5,087,064 A | * | 2/1992 | Guhlin | 280/507 |
| 5,381,679 A | * | 1/1995 | Cummins | 70/209 |
| 5,873,271 A | * | 2/1999 | Smith | 70/58 |
| 5,908,201 A | * | 6/1999 | Van Vleet | 280/416.1 |
| 6,354,119 B1 | * | 3/2002 | Molzer | 70/210 |
| 6,406,052 B1 | * | 6/2002 | Bale | 280/507 |
| 6,666,051 B1 | | 12/2003 | Li | |
| 6,722,686 B2 | | 4/2004 | Koy | |
| 6,802,523 B1 | * | 10/2004 | Profitt | 280/507 |
| 6,883,822 B1 | * | 4/2005 | Smith | 280/511 |
| 6,932,376 B1 | * | 8/2005 | Profitt | 280/507 |
| 7,044,494 B1 | * | 5/2006 | Cowett | B60D 1/02 280/416.1 |

(Continued)

*Primary Examiner* — Suzanne Barrett
(74) *Attorney, Agent, or Firm* — Isabel Kadoorie (57) ABSTRACT

A locking device for obstructing towing of an unattached trailer has a lock base and a single-armed curved interlock bracket. The lock base has a cylindrical leg. The single-armed interlock bracket has an grooved arm sliding along an aperture on the cylindrical leg and may be permanently attached to the lock base. Grooves on the arm allows a locking means to be engaged with the lock bracket at different height. When engaged, the locking means may restrict the interlock bracket from swirling. The open end of the interlock bracket provides flexibility to accommodate trailer couplers with different cap/rim sizes. The cylindrical leg may have a sealed bottom end and may function as a handle. The locking device may also feature a push-in locking mechanism to lock the interlock bracket in a position without using a key.

10 Claims, 7 Drawing Sheets

(56) References Cited

U.S. PATENT DOCUMENTS

| | | | |
|---|---|---|---|
| 7,121,121 B2 | 10/2006 | Wyers | |
| 7,264,261 B2 * | 9/2007 | Konsela | 280/507 |
| 7,390,008 B1 * | 6/2008 | Hall | B60D 1/065 |
| | | | 280/507 |
| 7,431,319 B2 * | 10/2008 | Staggs | 280/507 |
| 2003/0193167 A1 * | 10/2003 | Hall | B60D 1/065 |
| | | | 280/508 |
| 2003/0205884 A1 * | 11/2003 | Koy | 280/507 |
| 2004/0201201 A1 * | 10/2004 | Causey, Jr. | 280/511 |
| 2005/0039498 A1 | 2/2005 | Budge | |
| 2006/0186639 A1 * | 8/2006 | Rosario | 280/507 |
| 2009/0039619 A1 * | 2/2009 | Gries | 280/511 |
| 2009/0079163 A1 * | 3/2009 | Cuellar et al. | 280/507 |
| 2011/0309600 A1 * | 12/2011 | Allsop | B60D 1/065 |
| | | | 280/511 |
| 2014/0167391 A1 | 6/2014 | Elliott | |
| 2015/0097356 A1 * | 4/2015 | Breeden et al. | 280/507 |
| 2015/0123379 A1 * | 5/2015 | Yuan | B60D 1/06 |
| | | | 280/507 |
| 2015/0266348 A1 * | 9/2015 | Hauler | B60D 1/56 |
| | | | 280/505 |

* cited by examiner

Side View

SINGLE ARMED TRAILER COUPLER LOCKING DEVICE

CROSS-REFERENCE TO RELATED APPLICATIONS

This application claims priority to Provisional U.S. Patent Application No. 61/899,131, filed Nov. 1, 2013, the entirety of which is incorporated by reference herein.

FIELD OF INVENTION

The present invention relates to an anti-theft locking device used on a trailer hitch coupler to obstruct towing of an unattached trailer. More particularly, the present invention provides structural improvements over the conventional trailer locking devices.

BACKGROUND OF THE INVENTION

Use of trailers towed by various vehicles on the ground or in the water for storing and transporting goods in both domestic and industrial applications is well-known in the field. A typical trailer application may include a hitch mounted on a vehicle with a receiver for receiving a ball mount assembly and a coupler on a trailer with a socket for linking the trailer to the hitch through the ball mount assembly. When the trailer is not towed or not connected to the vehicle, it can be easily hitched up to another ball mount through the trailer's coupler front end and towed away by an unauthorized person. There is a recognized need for providing a security device such as a lock for blocking trailer coupler from being attached to a ball mount in order to prevent unauthorized removal of the trailer while the trailer is not in active use.

The above problem has been recognized in the art and various approaches have been attempted to address the issue. These include those described in U.S. Pat. No. 6,666,051, U.S. Pat. No. 6,722,686, U.S. Pat. No. 7,121,121, and U.S. Publication No 2005/0039498.

U.S. Pat. No. 6,722,686 provides a coupler lock with a removable U-shaped lock bar to engage with a lock housing having a ball-shaped dome to be attached to a trailer coupler socket so that the U-shaped lock bar is fastened over the trailer coupler to obstruct engagement between a hitch ball and the trailer couple socket. U.S. Pat. No. 6,666,051, U.S. Pat. No. 7,121,121, and U.S. Pub No. 2005/0039498 teach similar techniques of locking a trailer hitch coupler using a removable lock bar fastened to a lock housing having a ball-shaped member. Each of those devices requires the lock bar to be completely released from two apertures in the lock base in order to attach or detach the ball-shaped member to or from the coupler socket. Therefore, the lock bar may not be coupled to the lock housing when the device is not in use, which raises the issue of the lock bar being misplaced or lost.

Further as a conventional lock bar is fastened by engaging both arms in the two apertures on the lock base, alignment between the arms of the lock bar and the apertures of the lock base has to be well maintained. A slightly bent lock bar would prevent the arms from being slid through the apertures, which makes handling more difficult. And more openings and penetrations make the conventional lock base more prone to problems like blocked or rusty interior.

In addition, a conventional lock bar engaged in a lock base limits the models of trailer couplers that can be positioned over the ball-shaped member and secured by the lock bar. Trailer couplers are made with various cap sizes and/or rim sizes for trailers with different weight carrying capacity. Accordingly locking devices with different sizes of ball-shaped members and/or lock bar dimensions have to be selected for locking different models of trailer couplers. Therefore, a conventional coupler lock may not be used interchangeably on various trailer couplers that bear different cap and/or rim sizes.

SUMMARY OF THE INVENTION

The locking device of the present invention has been made to overcome the conventional drawbacks by providing an all-in-one device that has a lock base and a lock bracket. The lock base has an upright ball-shaped member and a cylindrical leg. The lock bracket is a single-armed interlock bracket. The single-armed bracket has an open end and a grooved arm on the other end. The grooved arm may slide into an aperture on the cylindrical leg.

When the locking device is in a locked condition with a trailer coupler, the ball-shaped member is seated in the socket of the trailer coupler, and the lock bracket is placed over the trailer coupler. After the lock bracket being pressed down, the lock bracket has a snugly fit over a section on the top of the trailer coupler. The section is preferably between the vertex of the coupler socket and the coupler's locking latch assembly. This snugly fit and the offset behind the vertex of the coupler socket provide a strong mechanism against a brutal force from turning the single-armed lock bracket in a potential attempt of breaking open the locking device. The offset distance may be optimized for maximum security. Grooves on the arm allows a locking component to be engaged with the lock bracket at different height. Furthermore, the grooves and the locking component may be engaged with each other in a way that restricts the lock bracket from swinging.

When the locking device is in an unlocked condition, the lock bracket may be lifted upwards and may be further swung away from the coupler so as to allow the locking device being removed from the coupler. In another aspect of the invention, the grooved arm remains attached to the lock base in unlocked conditions. Furthermore the grooved arm may be permanently inserted in the aperture.

The locking device of the present invention may further feature a detachable industrial standard sized ball-shaped member erecting upward from the lock base for coupling with a trailer coupler socket. Interchangeable ball-shaped members with different sizes may be selected and screwed or bolted onto the lock base.

The locking device of the present invention features a cylindrical leg that extends downward from the bottom main surface of the lock base. The leg may also extend upward from the top main surface of the lock base. The cylindrical leg may also function as a handle for holding the lock during the locking or unlocking process.

The locking device of the present invention may further feature one aperture on the cylindrical leg for housing the arm of the interlock bracket. The aperture may have a reduced diameter at the top end of the cylindrical leg. The aperture may be sealed on the bottom end of the cylindrical leg. The locking device of the present invention may further feature a curvature on the interlock bracket that is bent over the ball-shaped member to hold in place a coupler that caps over the ball-shaped member. The curved interlock bracket may have an open end that remains unattached to the lock base in order to leave space for fitting trailer couplers with different cap and/or rim sizes. The curved interlock bracket may have the single arm end inserted and permanently engaged in the aperture of the cylindrical leg.

The locking device of the present invention may further feature an anchoring mechanism on the single arm of the interlock bracket. The single arm may have an enlarged cap end at the bottom of the arm; Or a washer may be installed near the bottom end of the arm in order to keep the single arm permanently engaged in the aperture of the cylindrical leg. The locking device of the present invention may also feature a push-in locking mechanism to lock the interlock bracket in a position without using a key.

BRIEF DESCRIPTION OF THE DRAWINGS

The accompanying drawings, which are incorporated in and constitute a part of the specification, illustrate embodiments of the invention and together with the description, serve to explain the principles and structures of the invention.

DETAILED DESCRIPTION OF THE INVENTION

The locking device of the present invention is designed to be used with a towing coupler. A towing coupler, also known as a trailer coupler, is a device attached to an object being towed. During towing, the towing coupler is matched with a tow hitch installed on a vehicle. The object being towed is commonly referred as a trailer. The object being towed may be but not limited to a travel trailer, a bike trailer, a boat trailer, a single-axle dolly, a multiple-axle dolly, a semi-trailer truck, a popup camper, and a mobile home. When the object is not being towed, the locking device may be applied to the towing coupler in order to obstruct an unauthorized towing.

Reference is now made in detail to the exemplary embodiments of the invention, examples of which are illustrated in the accompanying drawings. Wherever possible, the same reference numbers will be used throughout the drawings to refer to the same or like parts. The description, embodiments and figures are not to be taken as limiting the scope of the claims.

Figure 1:
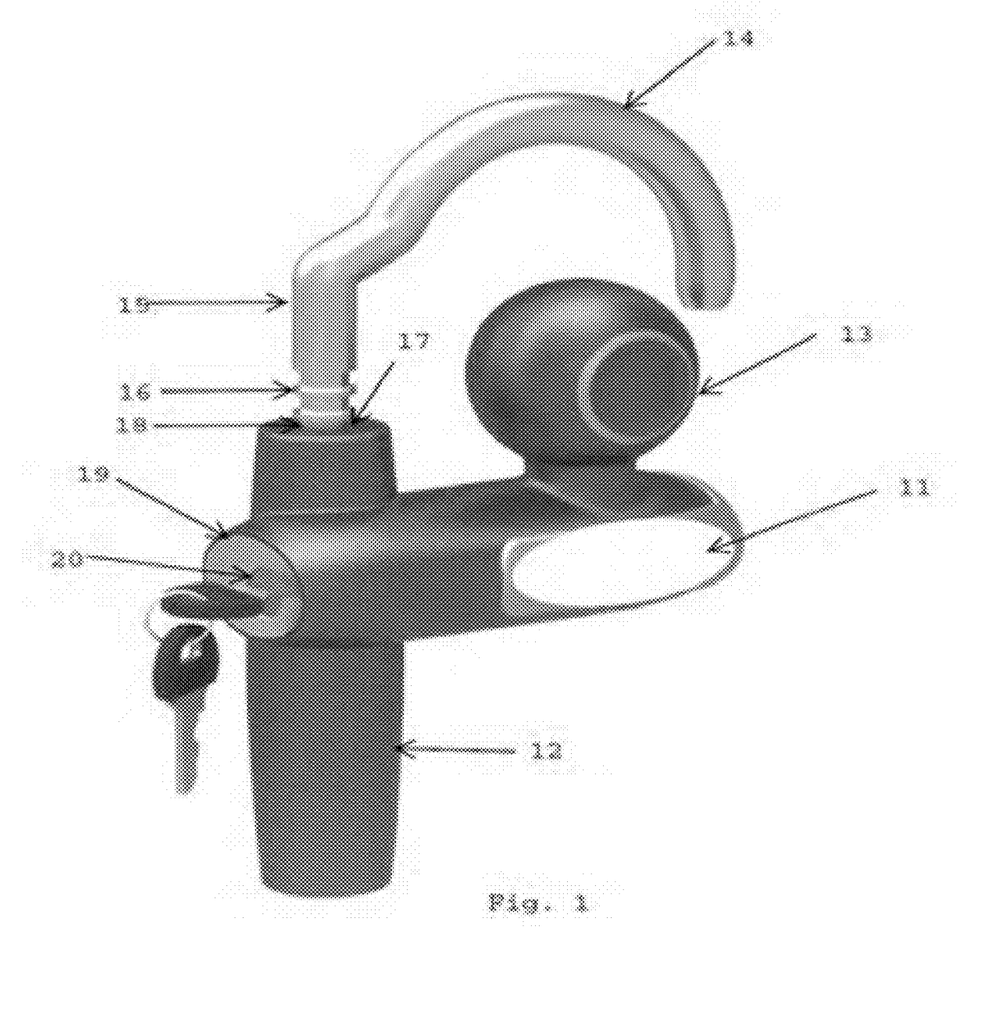
FIG. 1 illustrates corresponding components of a trailer locking device according to one preferred embodiment of the present invention.

FIG. 1 illustrates corresponding components of a trailer locking device according to one preferred embodiment of the present invention. The trailer locking device as described in FIG. 1, mainly includes a lock base (11), a ball-shaped member (13) erecting upright from the top surface of the lock base, one cylindrical leg (12) extending both upward and downward from the lock base, an aperture (17) running lengthwise along the cylindrical leg (12) and with an opening (18) on the top end of the leg, a lock housing (19) on the lock base enclosing a locking means (20), a curved interlock open bracket (14) having one arm (15) inserted into the cylindrical leg (12) through the aperture opening (18). The arm (15) may have ring grooves (16) or other means to be engaged with the locking means (20).

The lock base illustrated in FIG. 1 is a one-piece or an integrated piece boring several openings. A ball-shaped member is mounted on the top. The lock base has a front and a back. The front side and the left side of the lock base is shown in FIG. 1. A cylindrical leg extends both upward and downward from the left side of lock base and has an offset towards the back of the lock base. The left cylindrical leg facilitates a right-handed person to hold the cylindrical leg with left hand and operate the interlock bracket with right hand. Alternatively the cylindrical leg may be machined on the right side of the lock base. An aperture opening (18) is located at the top of the cylindrical leg (12). The aperture (17) forms an inner channel along the vertical center line of the cylindrical leg (12). The base may be sealed with the aperture opening at the top of the cylindrical leg for the arm of the interlock bracket to slide in and with a key hole on one side for inserting a key to lock or unlock the interlock bracket in position.

As shown in FIG. 1, the cylindrical leg (12) extends both upward from the top main surface of the lock base and extends downward from the bottom main surface of the lock base. Alternatively, the cylindrical leg (12) may only extend downward from the main surface of the lock base. The cylindrical leg (12) may also function as a handle for holding the lock during the locking or unlocking process. As shown in FIG. 1, the leg (12) is substantially cylindrical with a rounded cross-section view. Alternatively, the leg (12) may have a polygon shape at a cross-section view; or the leg (12) may have an ergonomic form to provide a better grip.

In one preferred embodiment, the aperture (17) run through the most of length of the cylindrical leg (12); but the bottom of the cylindrical leg is sealed to minimize the chance of the aperture being clogged or getting rusty. In an alternative embodiment, the aperture (17) may run completely through the leg to give more room for sliding the arm of the interlock bracket.

The curved interlock bracket has one arm (15) inserted into the aperture opening (18) and capable of sliding along the inner channel of the aperture (17). Rings along the arm create grooves which allow a lock component (not shown in FIG. 1) to be engaged with the arm at various heights so as to adjust the locking position of the bracket. When the diameter of the ring grooves are closely matched with the diameter of the aperture opening (18), it minimizes the chance of the aperture being clogged or getting rusty. Alternatively, a number of parallel grooves other than ring grooves may be etched or mechanically grooved onto the arm (15). For example, a series of parallel notches or spaced holes may be engraved or drilled on the arm. The grooves, notches, or holes allow a lock component to be engaged with the arm at various heights. Furthermore, a spiral groove may be alternatively machined onto the arm (15). The continuity of the spiral groove would allow the locking component to be engaged with the arm at various positions.

In one preferred embodiment, the lock component may be a lock ball. In alternative preferred embodiment, the lock component may be a pawl, a lock bin, or a lock bolt. The grooved arm (32) may have the notches that resembles teeth to be latched with a pawl in one direction. When the pawl is retracted, the grooved arm is free to slide both up and down. When the pawl is released, the grooved arm can only slide downwards that would tighten the interlock bracket onto a coupler.

Furthermore, the grooves and the locking component may be engaged with each other in a way that restricts the lock bracket from swinging. In one preferred embodiment, each of the grooves has a flat surface facing to the lock means so that when the lock component is engaged with one of the grooves, the lock bracket is restricted from swirling. In another preferred embodiment, each of the grooves has a caved-in surface facing to the lock means so that when the lock component is engaged with one of the grooves, the lock bracket is restricted from swirling.

The locking device of the present invention may further feature an anchoring mechanism on the single arm (15) of the interlock bracket (14). The aperture opening (18) at the top end of the cylindrical leg may have a reduced diameter smaller than the diameter of the inner channel of the cylindrical leg. The single arm (15) may have an enlarged cap end at the bottom of the arm; The cap end has a diameter larger than the diameter of the aperture opening (18) and smaller than the diameter of the inner channel of the cylindrical leg; So that the single arm (15) can slide up and down along the inner channel, but cannot completely slide out of the aperture opening (18). Alternatively a washer may be installed near the bottom end of the arm; The washer has an outer diameter larger than the diameter of the aperture opening (18) and smaller than the diameter of the inner channel of the cylindrical leg; So that the single arm (15) can slide up and down along the inner channel, but cannot completely slide out of the aperture opening (18).

The interlock bracket curves over the ball-shaped member. When the locking device is engaged with a trailer coupler, the trailer coupler is capped on the ball-shaped member and is held in place between the interlock bracket and the ball-shaped member. Because the open end of the lock bracket frees up the space between the ball-shaped member and the bracket, the present invention allows greater flexibility and better accommodation of trailer couplers with different cap and/or rim sizes.

In one preferred embodiment, the lock base shelters a lock means which may extends a ball or pin into the aperture of the cylindrical leg to engage in a groove between two rings on the arm of the interlock bracket that descends from the aperture opening. To lock the interlock bracket in position, the lock means may be simply pushed into the lock housing in the lock base without using a key which may be only needed for unlocking the bracket. During unlocking, a key may be inserted into the lock means and the lock means would bounce out of the lock housing as the key is turned so as to release the locking ball from the rings to free the interlock bracket. Alternatively other mechanical or electrical lock means may be integrated to the lock base.

When applying the trailer locking device in the field, unlock the lock means first. Once the lock component is released to free the grooved arm, the interlock bracket can be lifted upward through the aperture to a point that the grooved arm is stopped at the aperture opening (18) by the anchoring mechanism. The lifted bracket opens up the space between the bracket and the ball-shaped member to allow a trailer coupler socket to engage or disengage with the ball-shaped member whereas the interlock bracket never separates from the lock base.

Figure 2:
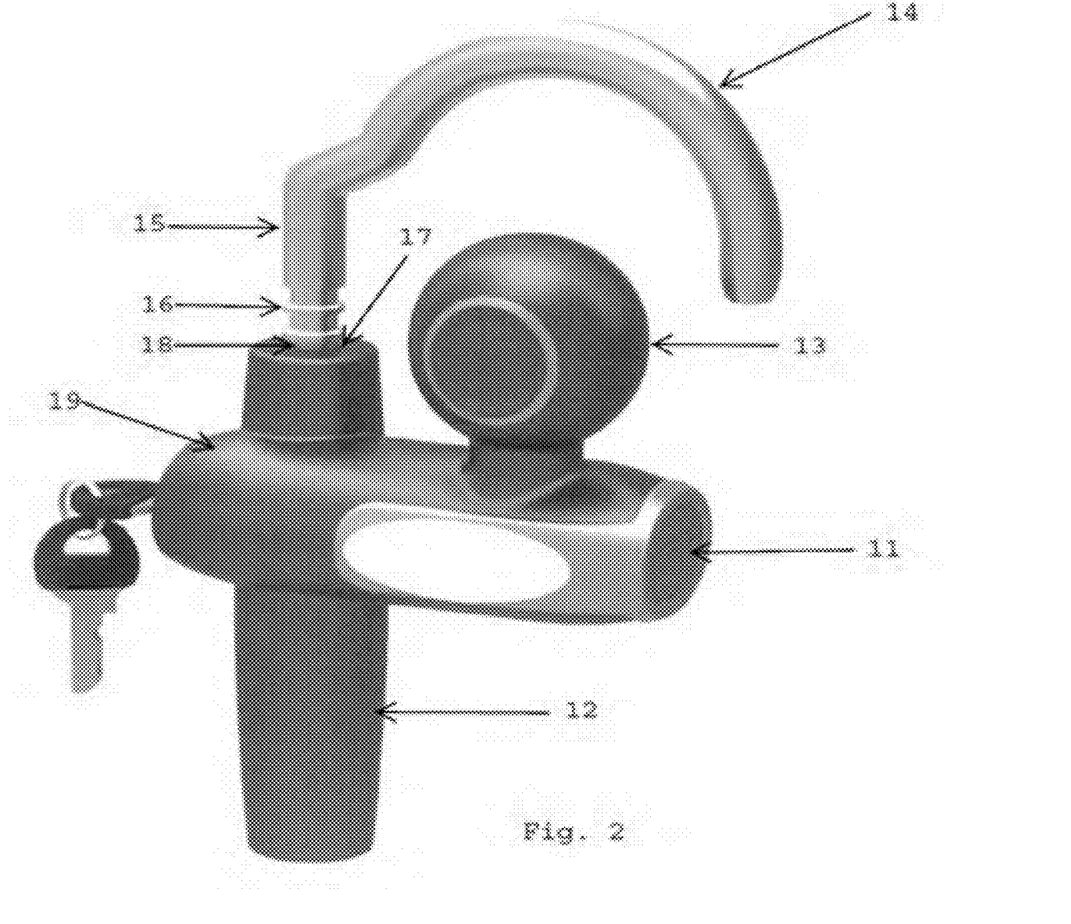
FIG. 2 illustrates a view of a trailer locking device with the interlock bracket in a locked position according to one preferred embodiment of the present invention.

FIG. 2 illustrates a view of a trailer locking device with the interlock bracket in a locked position according to one preferred embodiment of the present invention. To secure a locking device on a trailer coupler according to one preferred embodiment of the present invention: engage the ball-shaped member in the socket of a trailer coupler while the lock bracket is in open position; fasten the lock bracket over the trailer coupler by sliding it down through the aperture to a position that the lock bracket tightly hugs over the trailer coupler; then push the lock mean to latch the lock ball onto the ringed arm.

Figure 3:
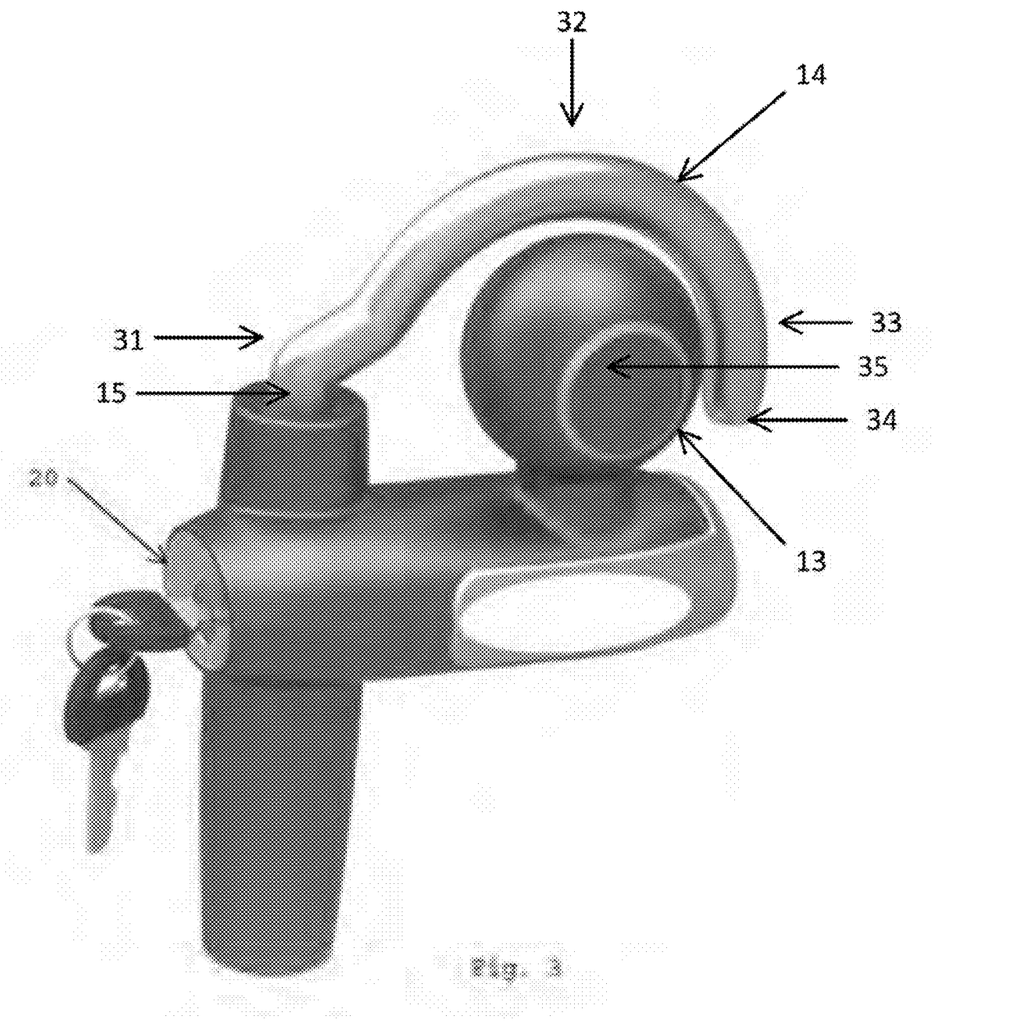
FIG. 3 illustrates a trailer locking device with the arm of the interlock bracket being pushed all the way down into the aperture of the cylindrical leg according to one preferred embodiment of the present invention.

FIG. 3 illustrates a trailer locking device with the arm of the interlock bracket being pushed all the way down into the aperture of the cylindrical leg according to one preferred embodiment of the present invention. The contour section of the lock bracket is bent over the ball-shaped member and embraces a coupler coupled with the ball-shaped member from three sides (the coupler is not shown). The first side (31), i.e. the inner side of the ball-shaped member, is extended from the straight section 15. The second side (32), i.e. the top side of the ball-shaped member, is over the top of the ball shaped member. And the third side (33) is on the opposite of the first side. On the third side, the contour section extends downwards. In relation to the three sides, the contour section of the lock bracket is structured in three continuous portions so that when in a locked position, the contour section of the lock bracket embraces the ball-shaped member from three sides by the three continuous portions, wherein a first portion of the contour section extended from the straight section embracing inner side of the ball-shaped member facing the leg portion extending upward, a second portion of the contour section crossing over too side of the ball-shaped member with a curvature fitting closely around the top side of the ball-shaped member, and a third portion of the contour section bent to embrace outer side of the ball-shaped member, opposite from the inner side, so that the end of the contour section does not reach or pass the lock base. The open end (34) of the contour section of the interlock bracket is downwards past the spherical center (35) of the ball-shaped member and stays exposed outside of the lock base. When the interlock bracket is pushed down to lock with a trailer coupler, the curvature of the bracket embraces the trailer coupler, and the open end of the interlock bracket may stay on top of the lip of the trailer coupler. In this way the interlock bracket leaves space for the rim of a trailer coupler when the locking device is applied to the trailer coupler. Trailer couplers with different weight carrying capacity may have different cap and/or rim size. This feature gives the present invention a better accommodation of trailer couplers with different cap and/or rim sizes.

Figure 4:
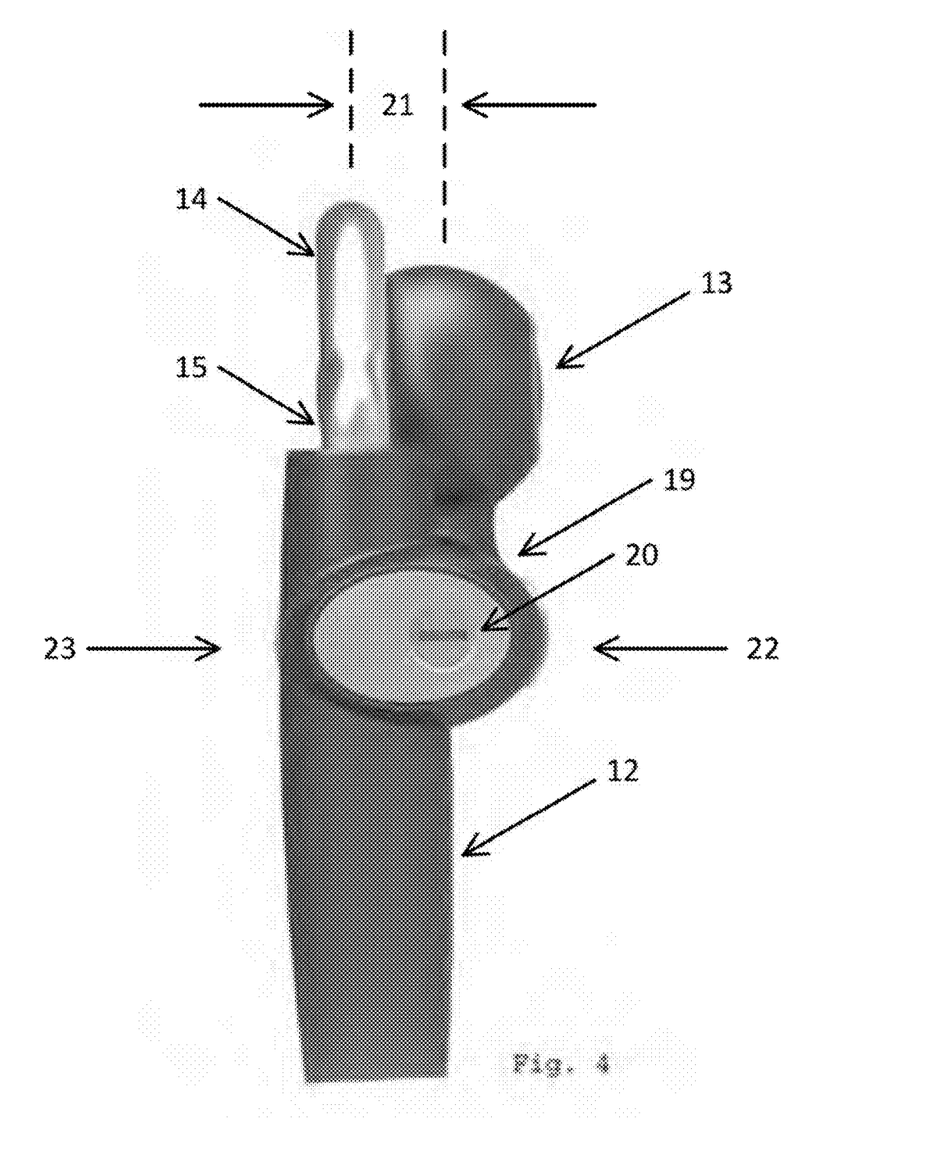
FIG. 4 illustrates a side view of a trailer locking device according to one preferred embodiment of the present invention.

FIG. 4 illustrates a left side view of a trailer locking device according to one preferred embodiment of the present invention. The arm of the interlock bracket has been pushed all the way down into the aperture of the cylindrical leg. The lock base has a front (22) and a back (23). The front side (22) and the left side of the lock base is shown in FIG. 1. A cylindrical leg extends both upward and downward from the left side of lock base and has an offset towards the back of the lock base (23). The back side of the lock base (23) is the side towards which the offset of the cylindrical leg is and is on the opposite of the front side. As shown in FIG. 4, the straight section and contour section of the lock bracket are disposed in a same plane. When the locking device is in a locked condition with a trailer coupler (The coupler is not shown in FIG. 4), the ball-shaped member is seated in the socket of the trailer coupler, and the lock bracket is placed over the trailer coupler. After the lock bracket being pressed down, the lock bracket has a snugly fit over a section on the top of the trailer coupler. The section is preferably between the vertex of the coupler socket and the coupler's locking latch assembly. Thus the back of the lock base (23) faces the coupler's locking latch when the lock is applied to a coupler. An offset distance (21) between the plane of the lock bracket and the center of the ball-shaped member is shown in FIG. 4, which may range from ½ to ⅘ of the radius of the ball shaped member. This snugly fit and the offset behind the vertex of the coupler socket provide a strong mechanism against a brutal force from turning the single-armed lock bracket in a potential attempt of breaking open the locking device. The offset distance may be optimized for maximum security according to the radius of the ball shaped member and/or the average rim size of the coupler.

Figure 5:
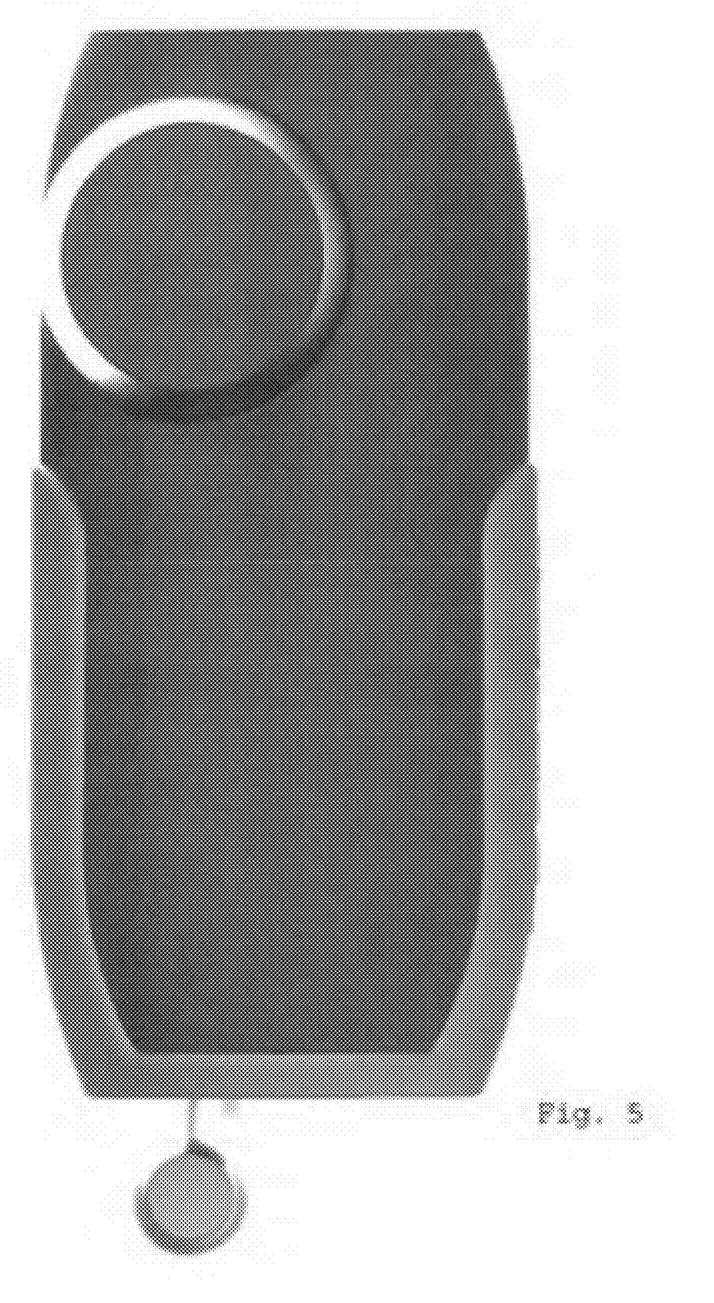
FIG. 5 illustrates a bottom view of a trailer locking device according to one preferred embodiment of the present invention.

FIG. 5 illustrates a bottom view of a trailer locking device according to one preferred embodiment of the present invention. In FIG. 5, the sealed bottom of the cylindrical leg is shown on the top, and the open end of the interlock bracket is shown on the bottom.

The structure of the locking device is not limited to what shown in FIGS. 1-5, but may be modified in various ways. For example, the base and the leg may be either welded together or die casted in one piece. The ball-shaped member may be welded on the base, or detachable from the base. Interchangeable ball-shaped members with different sizes may be selected and screwed or bolted onto the lock base. The ball shape of the ball-shaped member may be completely spherical or may be modified. As shown in FIG. 4, the ball-shaped member has a flattened front in one preferred embodiment.

Figure 6:
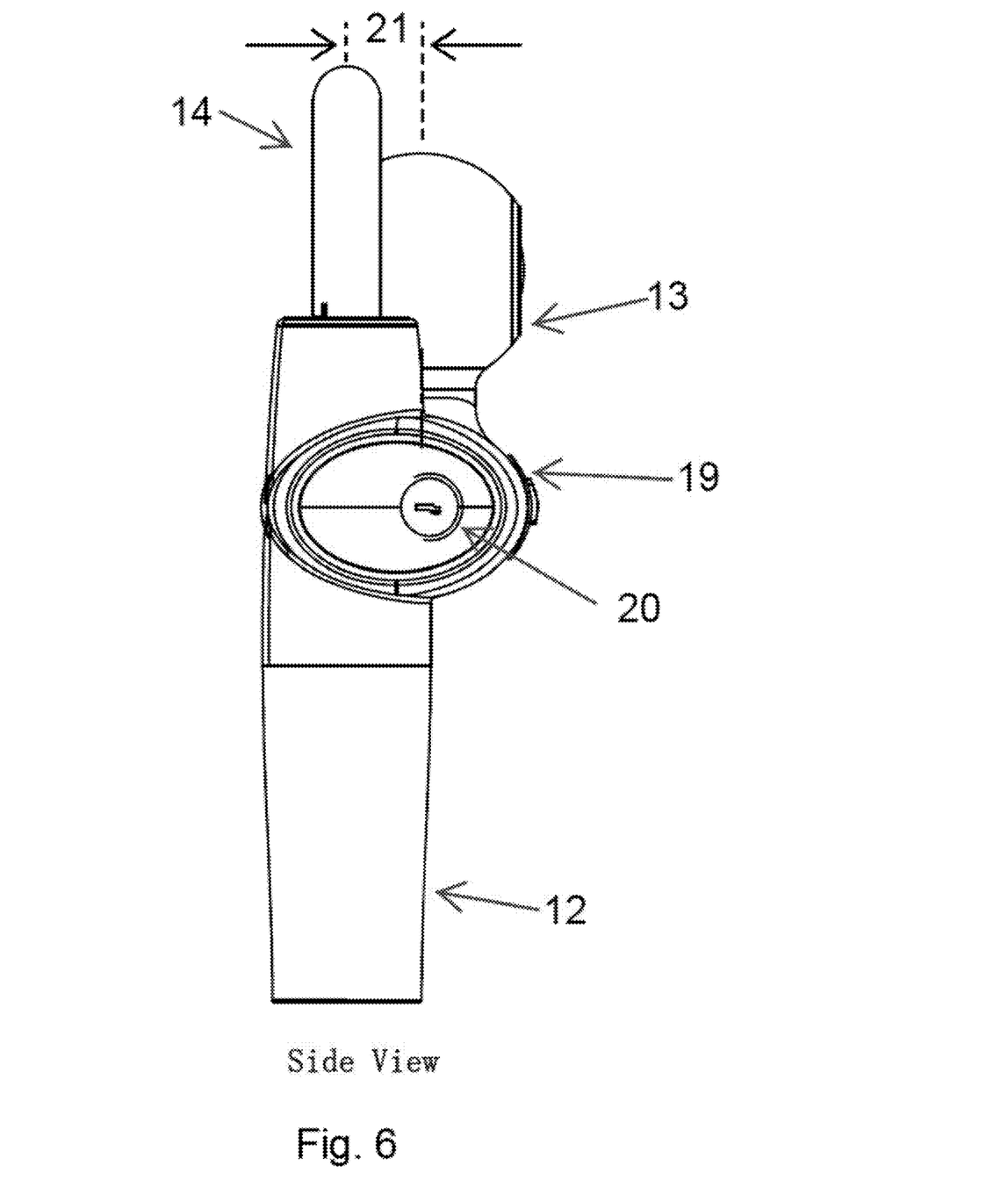
FIG. 6 illustrates a trailer locking device in a locked position from various viewpoints.
Figure 7:
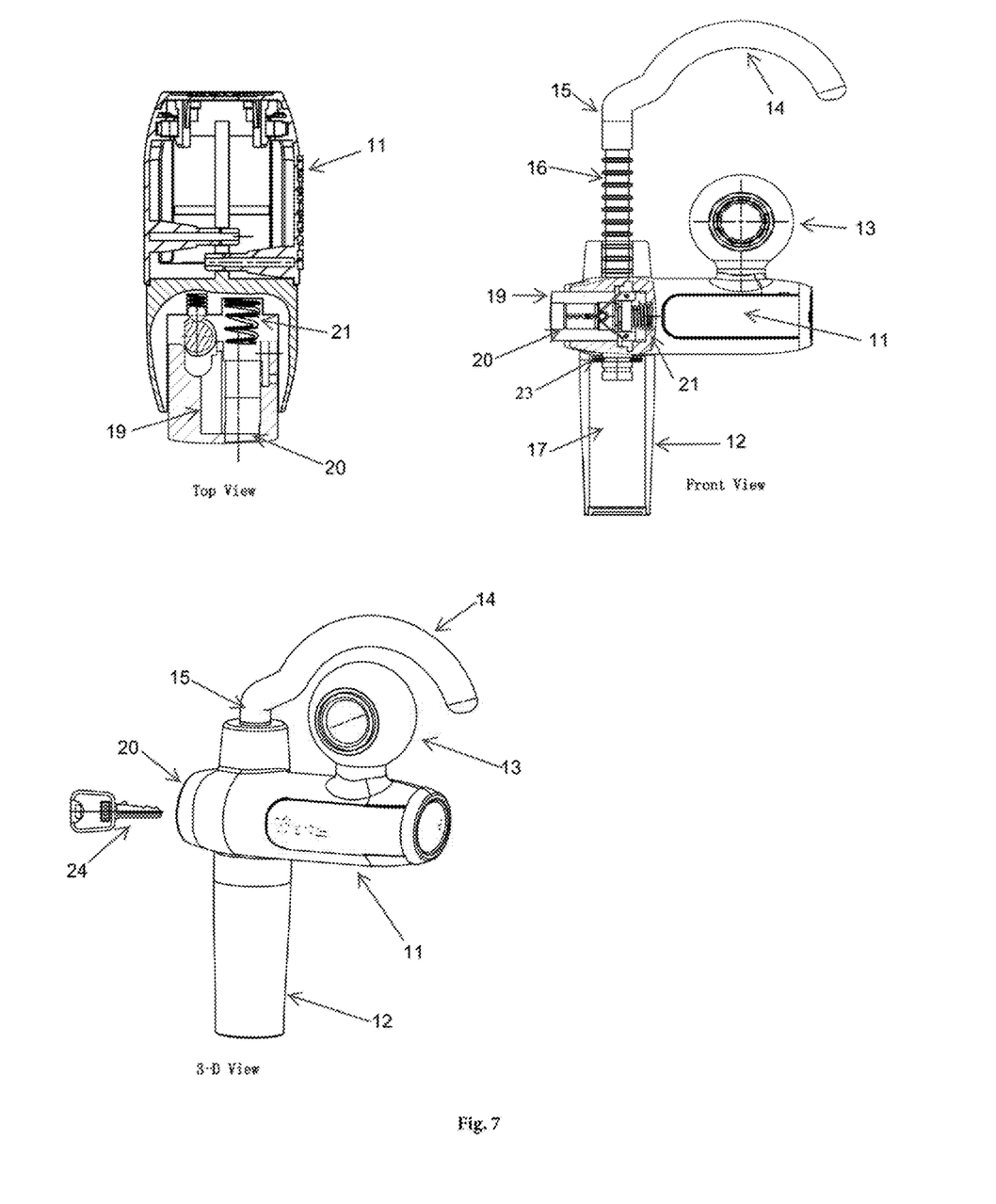
FIG. 7 illustrates a trailer locking device in an unlocked position from various viewpoints.

FIGS. 6 and 7 illustrate the trailer locking device in locked and unlocked positions correspondingly. The lock means (20) is pushed inward against a spring (21) in its lock housing (19) when locking the single arm (15) placed at a desired position. A lock ball(s) or a pin(s) (22) of the lock means (20) extend(s) out to interlock the single arm (15) by engaging the groove(s) (16) between the rings on the single arm (15) as illustrated in Back view of FIG. 6. Once in a locked position, the single arm (15) is fastened and prevented from moving vertically. A key (24) is used to unlock the lock means (20) by retracting the lock ball(s) (22) engaging the groove(s) (16). The coiled spring (21) pushes the lock means (20) out of the lock housing (19) upon releasing the lock ball(s) (22) as shown in FIG. 7. And the single arm (15) is now free to move up and down. The enlarged can end (23) at the bottom of the single arm (15) prevents the arm from escaping the leg completely.

What is claimed is:

1. A locking device to be used with a coupler for obstructing towing of an object comprising:
    a lock base with a ball-shaped member erecting upright from a top main surface of the lock base;
    a leg with a top opening and a sealed bottom with portions extending both upward and downward from the lock base, wherein the leg has an aperture that extends internally from the top opening of the leg towards the sealed bottom of the leg;
    a lock bracket of one piece having a contour section and a straight section that are disposed within a plane, wherein
    the contour section of the lock bracket is bent over the ball-shaped member with an open end, and remains exposed outside the lock base, the contour section of the lock bracket is structured in three continuous portions so that when in a locked position, the contour section of the lock bracket embraces the ball-shaped member from three sides by the three continuous portions, wherein a first portion of the contour section extended from the straight section embracing an inner side of the ball-shaped member facing the leg portion extending upward, a second portion of the contour section crossing over a top side of the ball-shaped member with a curvature fitting closely around the top side of the ball-shaped member, and a third portion of the contour section bent to embrace an outer side of the ball-shaped member, opposite from the inner side, so that the end of the contour section does not reach or pass the lock base; and
    the straight section of the lock bracket extends from the contour section into the aperture through the top opening of the leg, wherein the straight section of the lock bracket slides in the aperture of the leg to engage in various locking positions, when locking, the straight section of the lock bracket slides downward in the aperture of the leg without penetrating through the sealed bottom, and when unlocking, the straight section of the lock bracket slides upward in the aperture and a part near an end of the straight section of the lock bracket stays attached within the aperture of the leg so that the straight section of the lock bracket does not completely slide out of the leg; and
    a locking means remaining housed in the lock base to interlock only with the lock bracket at one of a plurality of positions along the straight section of the lock bracket, when in a locked condition, the locking means restricts the lock bracket from swinging, and the plane of the lock bracket has an offset distance away from a center of the ball-shaped member and the lock base.

2. The locking device according to claim 1, wherein the locking means is capable of push-to-lock without using a key.

3. The locking device according to claim 1, wherein when the locking device is in an locked condition, the lock bracket is lifted, the part near bottom of the straight section of the lock bracket stays in the aperture and remains attached to the leg via an anchoring mechanism.

4. The locking device according to claim 1, further comprising grooves on the straight section of the lock bracket, wherein the grooves allow the locking means to interlock with the lock bracket at one of more positions along the straight section.

5. The locking device according to claim 4, wherein the grooves and the locking means prevent the straight section of the lock bracket from rotating when the locking means is engaged in a locked condition.

6. The locking device according to claim 4, wherein the grooves are ring grooves.

7. The locking device according to claim 4, wherein the grooves are formed as a continuous spiral.

8. The locking device according to claim 4, wherein the grooves are spaced holes.

9. The locking device according to claim 1, wherein the offset distance is optimized according to the radius of the ball shaped member.

10. The locking device according to claim 1, when in locked position, wherein the third portion of the contour section of the lock bracket extends downwards with the open end past spherical center of the ball-shaped member on the outer side.

* * * * *